INVENTORS
Opal Smith
BY Oral C. Dudley

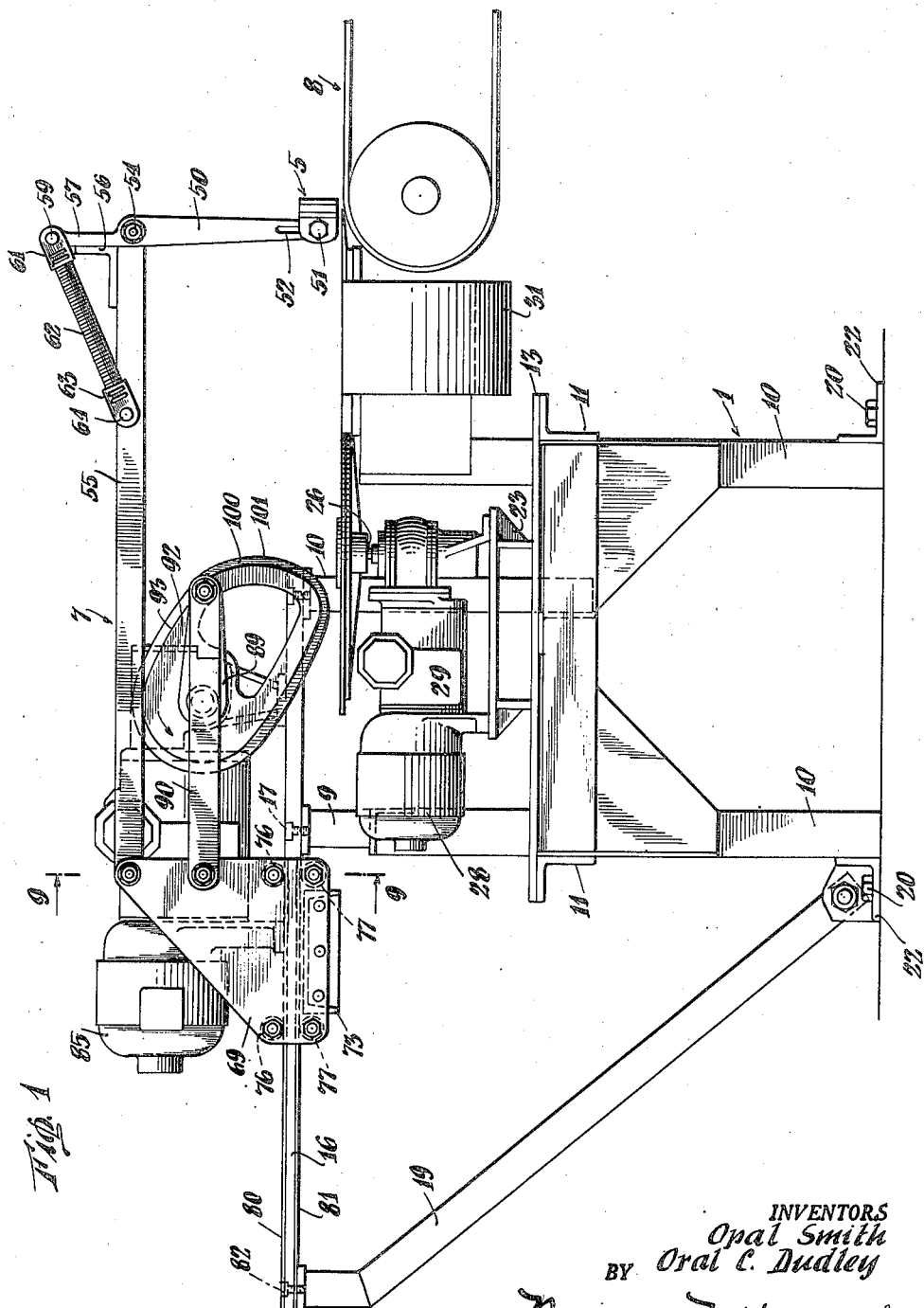

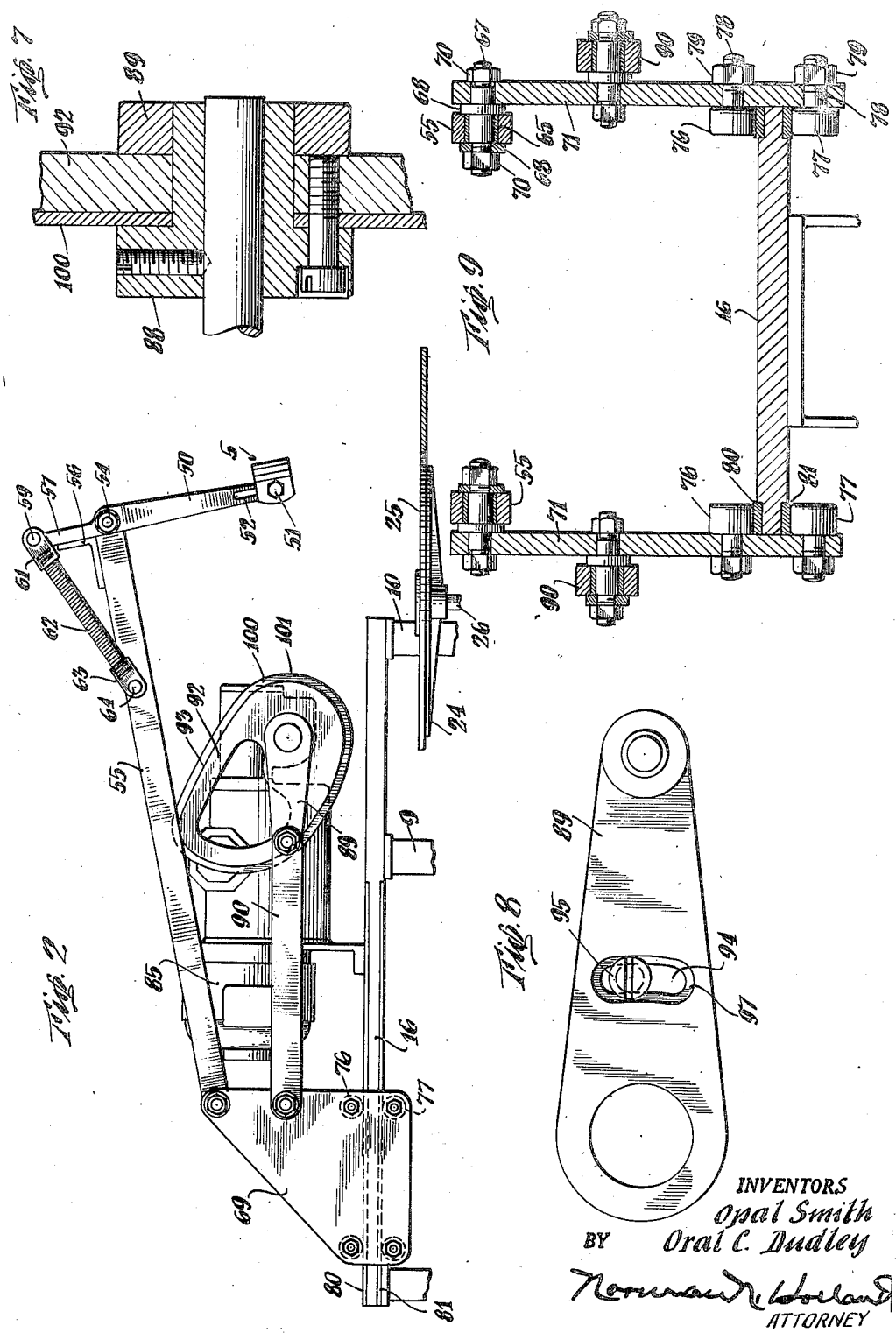

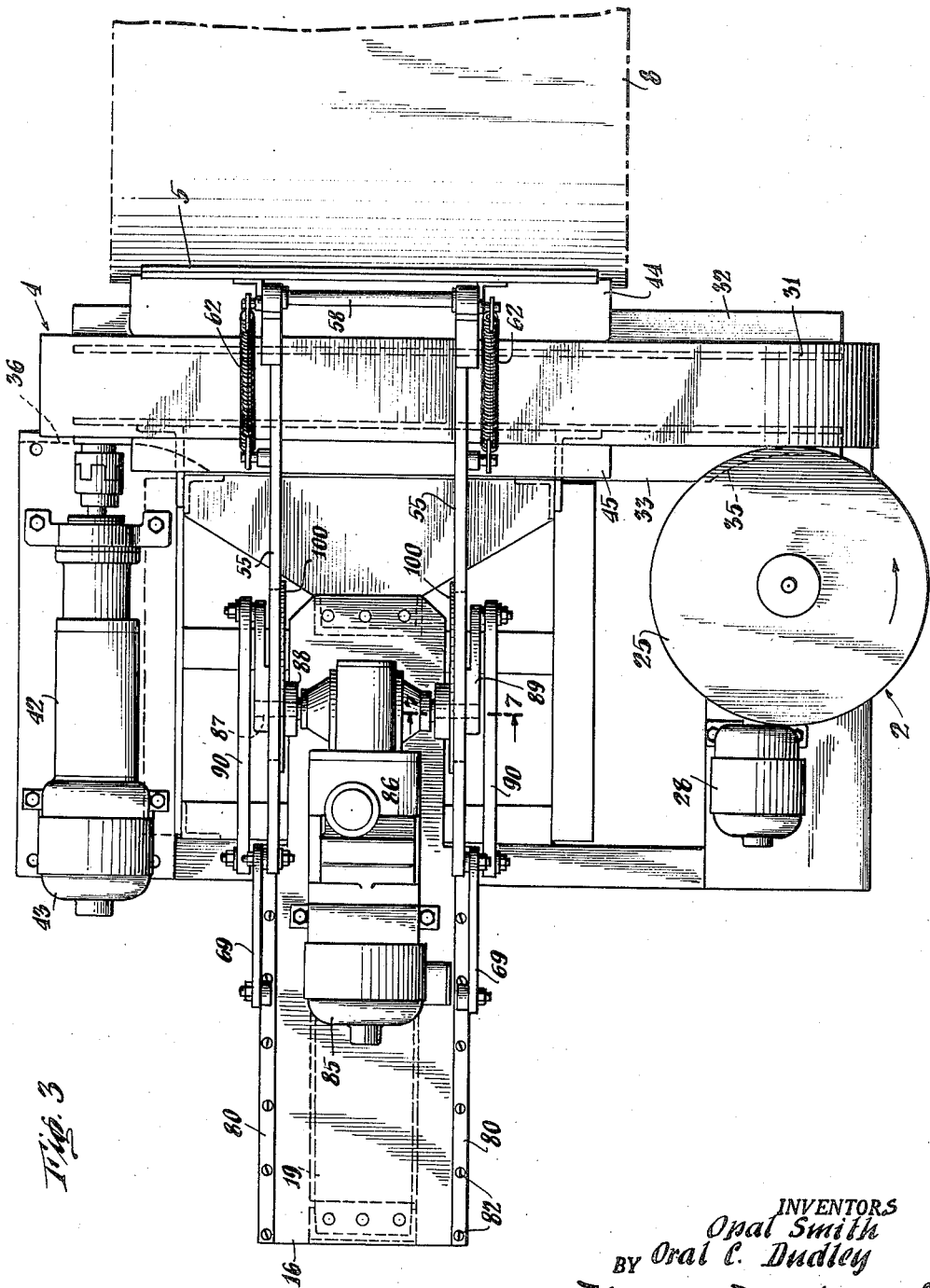

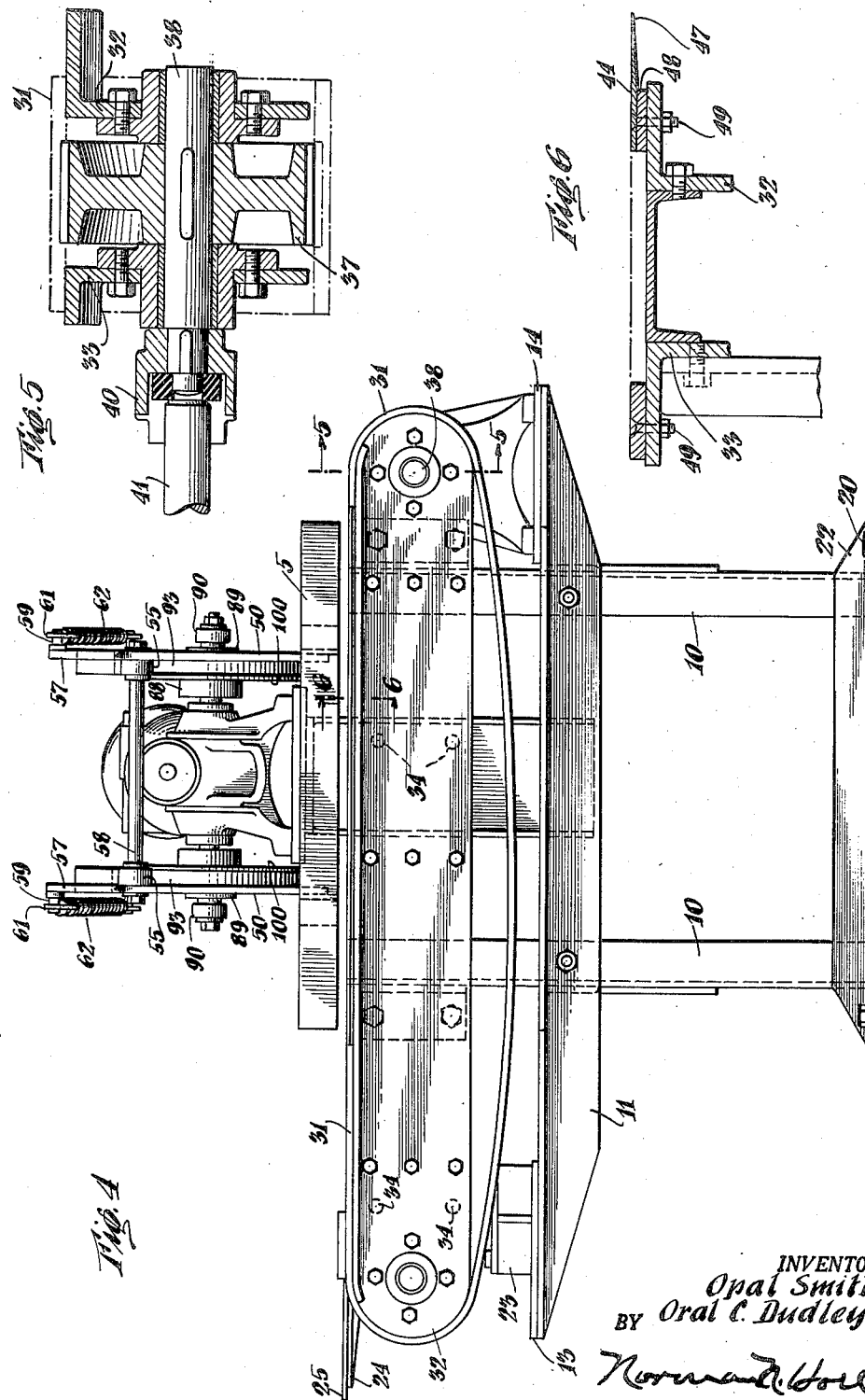

ATTORNEY

Patented Apr. 3, 1951

2,547,791

UNITED STATES PATENT OFFICE 2,547,791

GLASSWARE TRANSFERRING MECHANISM

Opal Smith and Oral C. Dudley, Winchester, Ind., assignors to Anchor Hocking Glass Corporation, Lancaster, Ohio, a corporation of Delaware Application April 4, 1947, Serial No. 739,322

11 Claims. (Cl. 198—31)

The present invention relates to transferring mechanisms or devices and more particularly to one adapted to move glassware from a conveyor belt onto the belt of an annealing lehr.

In the manufacture of glassware it is customary to first mold or form articles from molten glass and to then transfer the formed articles to an annealing lehr for removing or relieving objectionable internal stresses and strains set up upon cooling of the article. If such stresses and strains are allowed to remain, the resulting articles are objectionably brittle and subject to excessive breakage during use.

Where articles are manufactured continuously in large quantities by glass machinery it is most desirable, for efficient operation, that every possible operation be performed mechanically and it is hence preferable that means be provided for continuously and automatically transferring articles to a lehr belt. Such machines or devices are referred to generally as lehr loaders or stackers.

The present invention aims to satisfy the above and other requirements or advantages by providing a new and improved mechanism or device for receiving glassware from a forming machine and automatically and continuously transferring it to a moving lehr belt.

An object of the present invention is to provide a new and improved lehr loading mechanism.

Another object of the invention is to provide a new and improved lehr loading mechanism adapted to minimize the possibility of upsetting or overturning glass articles.

Another object of the invention is to provide a new and improved pusher bar mounting.

Still another object of the present invention is to provide a lehr loader which may be readily and inexpensively manufactured.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

Fig. 1 is a side elevational view showing a preferred embodiment of the present invention;

Fig. 2 is a side elevational view showing the upper part of the mechanism illustrated in Fig. 1 with the parts in a different position;

Fig. 3 is a top plan view of the mechanism illustrated in Fig. 1;

Fig. 4 is a front elevational view of the machine illustrated in Figs. 1 and 3;

Fig. 5 is an enlarged sectional view taken along the line 5—5 of Fig. 4;

Fig. 6 is an enlarged fragmentary sectional view taken along the line 6—6 of Fig. 4;

Fig. 7 is an enlarged fragmentary sectional view taken along the lines 7—7 of Fig. 3;

Fig. 8 is a side view showing one form of timing adjusting means;

Fig. 9 is an enlarged sectional view taken along the line 9—9 of Fig. 1;

Figure 10:
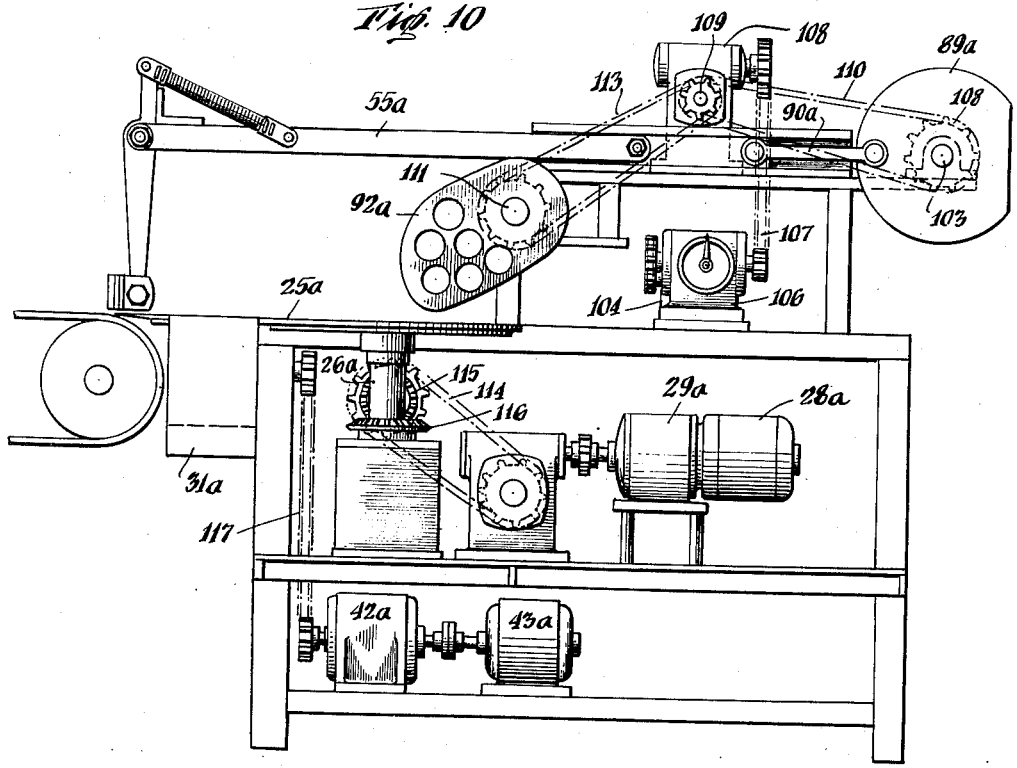
Fig. 10 is a side elevational view showing a modified form of the present invention.

Described generally, the present transferring mechanism or lehr loading device comprises (Figs. 1–4) a framework 1 having mounted thereon a transfer disc and operating mechanism 2, an article conveying belt and drive mechanism 4, and a pusher bar 5 and drive mechanism 7. The pusher bar drive mechanism 7 is adapted to actuate the pusher bar 5 in timed relationship with respect to the movement of the conveyor belt 4 and transfer disc 2 and to thereby push or transfer glass articles spaced along the conveyor belt 4 from the belt onto an angular disposed belt 8 of an annealing lehr.

Referring again to the drawings, there is shown a frame 1 comprising a plurality of suitably spaced upright supporting legs 10 having mounted thereon horizontally positioned drive support angles 11. Adjacent one side of the support angles 11 is positioned a disc drive base 13, and at the other side thereof is shown a conveyor drive base 14. A pusher mechanism drive base 16 is secured by bolts 17 to the upper ends of an extension 9 of the frame legs 10 and is bolted at the outwardly disposed end thereof to a knee brace 19. The legs 10 of the frame or table 1 may be fixed in position on a base or floor by bolts 20 which extend through apertures in retaining angles 22.

The transfer disc and operating mechanism 2, referred to in connection with the general description, is shown retained in operative position on a platform 23 welded or otherwise secured to the disc drive base 13. The transfer disc preferably comprises a lower disc 24, of cast iron or the like, having secured to the upper surface thereof a separate disc 25 made of some softer material such as aluminum, each of the discs being carried by a vertically disposed and rotatably mounted shaft 26. The shaft 26 may be rotated by a motor 28 through the intermediation of a suitable speed reducer 29. A one-quarter horsepower motor 28 normally turning at 1725 revolutions per minute and a speed reducer 29 having a range of 8 to 1 with output revolutions per minute of 16.5 to 2 have proven satisfactory. A suitable, commercially available disc drive is that known by the trade name "Speedranger."

The rotating upper transfer disc 25 normally receives glass articles from a moving conveyor belt (not shown) and transfers them to the moving conveyor belt 31, which is substantially tangentially disposed with respect to the edge of the disc 25. Various forms of guide bars or wires (not shown) may be utilized to assist in the movement or guiding of articles from the transfer disc 25 to the belt 31.

The conveyor belt 31 transfers the articles, delivered thereto by the rotating disc 25, to a position adjacent the push bar 5. The conveyor belt 31 is shown carried by and travelling along the horizontally positioned flanges of spaced angle members 32 and 33 which form supporting tracks for the conveyor. The flanges of the spaced angles 32 and 33 are preferably so disposed vertically that the upper surface of the belt 31 is substantially at the same level as the upper surface of the disc 25 so that articles may readily move from the disc 25 onto the adjacent moving conveyor belt 31.

The horizontally disposed flange of the inner angle member 35 is shown recessed or cut away at its opposite ends 35 and 36. This construction facilitates positioning of the transfer discs and operating mechanism 2 at either end of the conveyor belt mechanism, with the edge of the upper disc 25 substantially tangential to an edge of the belt 31. The conveyor drive mechanism may likewise be shifted from the position shown in Figs. 3 and 4 to the opposite side of the machine so that the conveyor belt may be driven in either direction from either end thereof and so that the disc 25 and its drive mechanism is adapted to feed glassware to the belt from either end thereof; with some lehrs it is desirable to use what may be termed a left hand machine and other lehr arrangements make a right hand machine preferable. The angle supports 32 and 33 may have extra sets of mounting holes to facilitate interchanging the disc and conveyor drives.

A conveyor chain or belt having a width of 7½ inches has been found suitable in actual practice and it may be driven by sprockets 37 (Figs. 5 and 3) keyed to a shaft 38, which is in turn connected by a flexible coupling 40 and shaft 41 with a speed reducer 42 and motor 43. A one-quarter horsepower motor 43 normally turning at 1140 revolutions per minute and a speed reducer 42 having a speed range of 8 to 1 with output revolutions per minute of 30 to 3.7 have proven satisfactory.

Adjacent the push bar 5, the conveyor belt 31 is preferably guided by and between spaced plate or guide members 44 and 45 (Fig. 6), the upper surfaces of which are substantially level with the upper surface of the conveyor belt 31. The outwardly disposed plate member 44 is shown with a tapered edge 47 and retained in position against the horizontal flange of the angle 32 by a spacer member 48 and bolts 49. The tapered outer edge of the upper plate member 44 is adapted to fit close to the upper surface of the lehr conveyor 8 to thereby facilitate smooth or even movement of glass articles from the conveyor belt 31, across the surface of the plate member 44, and onto the moving lehr conveyor 8.

The rotating disc 25 delivers the articles to the conveyor belt 31 continuously so that the articles move in a line in front of the pusher mechanism, and the pusher mechanism moves the push bar 5 at such timed intervals that a plurality of glass articles are moved from the belt 31 onto the lehr belt 8. The push bar and its operating mechanism are actuated in timed relationship with respect to the moving conveyor belt 31 so that the push bar 5 removes articles from the belt at each "forward" stroke and so that upon the return stroke it elevates to clear articles which have moved with the belt during a forward stroke of the push bar; this latter elevating feature will be hereinafter described.

The push bar and its operating mechanism are preferably located at approximately the midportion of the length of the conveyor belt 31 (Fig. 3) and the push bar 5 is shown carried adjacent the lower end of spaced links or depending members 50 by bolts 51 which may extend through slots 52 in the links 50. The slot and bolt arrangement facilitates varying the height of the push bar with respect to the upper surface of the conveyor 31 so that the push bar may be effective to move an article by pressing against that portion which is least likely to overturn it.

The links 50 are pivotally or rotatably secured to spaced arms or carrying members 55, with upper parts of the links 50 extending upwardly past angle or stop members 56. The upper ends of the link extensions 57 are connected by studs 59, spring clips 61, springs 62, spring clips 63, and studs 64 with the arms or carrying members 55 at locations spaced from the outer ends thereof. The springs 62 thus serve to yieldably urge or pull the link extensions 57 against the stop members 56. In the event the push bar should strike or press against a relatively immovable object or article the push bar and its carrying links 50 may move about the pivot or rotatable mounting 54 in opposition to the retaining effect of the spring or other yieldable member 62. When the obstruction is removed the springs 62 serve to return the link extensions 57 and links 50, together with the push bar 5, to their normal operative positions.

The desired spacing of the outer ends of the carrying arms 55 may be maintained by a suitable separator rod 58. The opposite ends of the arms or carrying members 55 are preferably rotatably connected with spaced upright members 71 by bearings 65, studs 67, washers 68 and nuts 70 (Fig. 9), the upright members 71 being retained in spaced relationship by a channel or bracing member 73. The lower portions of the spaced upright side members 71 are preferably provided with upper and lower guide rollers 76 and 77 retained in operative position on the side members by nuts 78 and bolts 79. The guide rollers 76 and 77 are adapted to travel along brass strips or rails 80 and 81 retained in recesses of the pusher drive base 16 by screws 82.

As the frame 69 comprised of the spaced upright side members 71 and lower spacing member 73 moves to and fro along the tracks provided by the inset guide rails 80 and 81, the pusher arms or carrying members 55 are moved to and fro substantially longitudinally and the link members 50 which carry the pusher bar 5 adjacent their lower ends are caused to move transversely with respect to the conveyor belt 31.

Movement of the slide frame 69 to and fro along the pusher drive base 16 may be achieved by a motor 85 through the intermediation of a speed reducer 86, rotatable shafts 87, hubs 88, crank members 89 and connecting rods 90. As the motor 85 rotates the shafts 87 and the hubs 88 keyed thereto, the cranks 89 rotate with the shaft and effect translation of the slide frame 69 toward the right or left (Figs. 1–3).

In connection with return movement of the push bar 5 toward an initial position at the left of Figs. 1, 2 and 3, it is desirable to first withdraw the push bar slightly from the glass articles and to thereafter elevate the push bar so that it may clear additional glass articles moving along with the conveyor belt 31 to a position where they may be transferred from the conveyor 31 by a succeeding pusher stroke. This desirable withdrawing and elevating movement may be achieved by means of cam members 92 shown supporting the arms 55 and operated by the shafts 87 in timed relationship with respect to the translatory motion given the push bar 5 by the slide frame 69 and its operating means. As the shafts 87 rotate the cranks 89 in a counter-clockwise direction from the position shown in Fig. 1, the arms 55 move toward the left. Since the cams 92 are also fixed to the hubs 8 of the shafts 87 and rotates with it, the exterior surfaces 93 of the cams serve to lift the spaced arms 55 upwardly simultaneously with the longitudinal movement of the arms 55 caused by the slide frame 69. In Fig. 2 the arms 55 are shown in elevated position.

To facilitate obtaining a desired timing relationship between the longitudinal movement of the members 55 caused by the slide frame 69 and the elevational movement caused by the cam surfaces 93, the crank members 89 are preferably provided with arcuate slots 94 through which extend bolts or studs 95 carried by and threaded into the cams 92; with this construction the cranks 89 may be shifted angularly with respect to the cams 92 to vary or selectively determine the timing relationship between the longitudinal movement caused by the slide frame 69 and the elevational movement effected by the cams 92. When a desired setting or selective determination has been made, the studs 95 may be tightened against shoulders 97 of the arcuate slots 94 to retain the correct setting.

In order to facilitate maintaining correct spacing and guiding of the carrying arms or members 55, there are preferably provided cam flange plates 100 on each of the hubs 88, the upwardly extending edges 101 of the cam flange plates being inwardly disposed with respect to the vertical side surfaces of the carrying arms 55. With this construction the cam surfaces 93 effect elevation and lowering of the arms 55 and the outwardly extending flanges 101 act as guideways or tracks for maintaining the correct spacing and guiding of the arms 55; thus the push bar 5 carried by the arms 55 sweeps across substantially the same area of the belt 31 at each forward stroke thereof and effectively co-ordinates with movement of the belt 31 for removing glass articles from it.

A one-half horsepower electric motor 85 normally turning at 1725 revolutions per minute and a speed reducer 86 having a speed range of 8 to 1 with output revolutions per minute of 16.5 to 2 have proven satisfactory, but it will be understood that any suitable drive or operating mechanisms may be utilized for actuating the pusher mechanism, the disc mechanism or the conveyor drive mechanism.

Since the operation of the present lehr loader or transferring device has been brought out hereinabove in connection with the description, it is believed that further discussion of the operation at this point is unnecessary.

Figure 11:
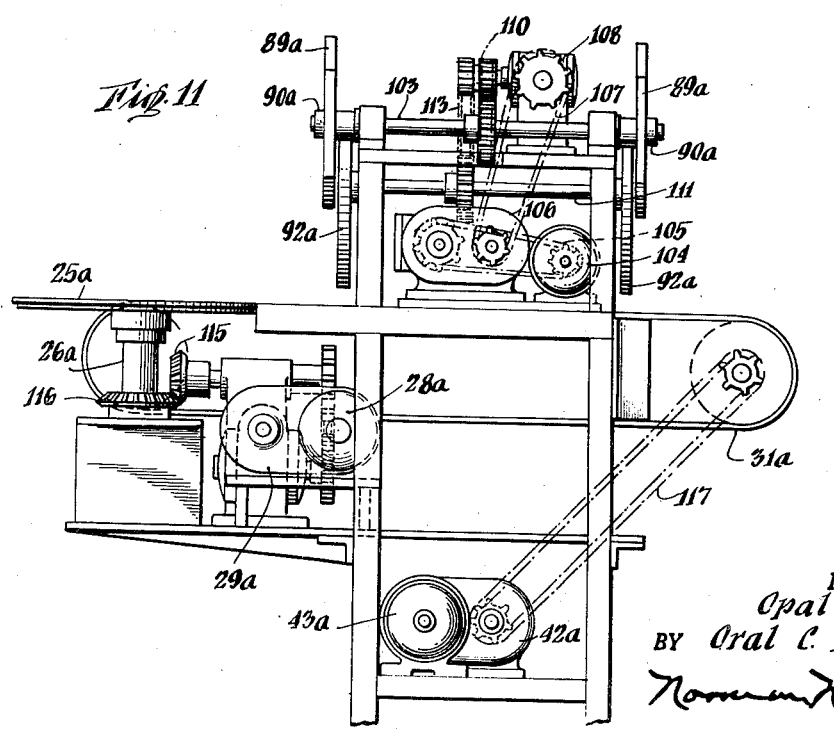
Fig. 11 is an end view of the machine illustrated in Fig. 10.

In Figs. 10 and 11 there is shown a modified form of the present lehr loader or transferring device. In this form the arms or push bar carrying members 55a are joined by connecting rods 90a with rotatable crank or disc members 89a, the latter members being keyed to a rotatable shaft 103. The shaft 103 may be rotated by an electric motor 104 through the intermediation of a drive belt 105, speed reducer 106, drive belt 107, suitable gearing 108, shaft and gearing 109 and drive belt 110.

A cam 92a supports the arms 55a and is effective to elevate and lower these arms in timed relationship with respect to the longitudinal movement of the member 55a. The cam 92a may be rotated by a shaft 111, to which it is keyed, by means of a drive belt 113 which is also connected with the same shaft and gearing 109 which rotates the shaft 103 that carries the connecting rod or disc 90a.

The transferring disc 25a may be rotated by an electric motor 28a through the intermediation of suitable speed reducers 29a, drive belt 114 and intermeshing gears 115 and 116, the latter gear being carried by the shaft 26a.

The conveyor belt 31a may be rotated by an electric motor 43a, speed reducing mechanism 42a, and drive belt 117.

The drives for the conveyor belt 31a and the transferring disc 35a may be interchanged similarly to the preferred embodiment, depending upon the particular side of the mechanism from which it is desired to feed articles of glassware. In some instances it has been found satisfactory to utilize a 4 to 1 drive for the transferring disc 35a and 6 to 1 drives for the pusher mechanism, and the conveyor mechanism. Speed reducing mechanisms of the "Link-Belt" type have performed satisfactorily with this modified form of the invention.

It will be seen that the present invention provides a new and improved lehr loader or ware transferring device having the push bar thereof driven by a relatively simplified drive mechanism. Elevating cams directly support the push bar carrying arms and are available for ready inspection at all times. Selective determination of timing relationship between longitudinal and vertical movements of the push bar carrying arms and the push bar may be readily made by changing the angular relationship of the crank with respect to the elevating cam. The drives for the conveyor belt and the transferring disc may be readily interchanged so that the lehr loader may be operated at either side of a lehr; that is, ware may be taken on at either side of the lehr loader. Maintaining of the push bar supporting arms in correctly spaced relationship at all times is facilitated by interiorly disposed cam flange plates, which form with the cam surfaces guideways or tracks for the spaced arms. Drive mechanisms are readily accessible for inspection, adjustment or maintenance. The device is rugged in construction and well adapted to withstand the rough usage to which it may be subjected.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described our invention, we claim:

1. In a glassware transferring device, the combination of a push bar, an arm carrying said push bar adjacent one end of said arm, movable means operatively connected with said arm adjacent the other end thereof for actuating said arm to achieve movement of the push bar substantially transversely of a conveyor belt, a trackway for guiding said movable means, cam-means supporting said arm intermediate the ends thereof adapted to elevate the arm-carrying end thereof during movement to an initial position, and a drive shaft connected with said cam means for rotating the cam means and connected with said movable means for moving it.

2. In a device of the class described, the combination of a push bar, an arm carrying said push bar, a movable frame pivotally connected with said arm adjacent one end thereof, a trackway for guiding said frame during movement thereof, a rotatable shaft, a cam supporting said arm and fixedly connected with said shaft, and means connecting said rotatable shaft with said movable frame, whereby rotation of said shaft is effective to cause substantially longitudinal movement of the frame and rotary movement of said supporting cam in timed relationship with respect to each other.

3. In a device of the class described, the combination of a push bar, an arm carrying said push bar, a movable frame pivotally connected with said arm adjacent one end thereof, a trackway for guiding said frame during movement thereof, a rotatable shaft, a cam supporting said arm at the underside thereof and fixedly connected with said shaft, and a crank member operatively connecting said rotatable shaft with said movable frame, whereby rotation of said shaft is effective to cause substantially longitudinal movement of the frame and rotary movement of said supporting cam in timed relationship with respect to each other.

4. In a device of the class described, the combination of a push bar, an arm carrying said push bar, a movable frame pivotally connected with said arm adjacent one end thereof, a trackway for guiding said frame during movement thereof, a rotatable shaft, a cam supporting said arm at the underside thereof and fixedly connected with said shaft, a crank member operatively connecting said rotatable shaft with said movable frame, whereby rotation of said shaft is effective to cause substantially longitudinal movement of the frame and rotary movement of said supporting cam in timed relationship with respect to each other, and means for selectively determining said timed relationship comprising a retaining member carried by said cam extending through a slot in said crank member.

5. In a glassware transferring device, the combination of a push bar, an arm carrying said push bar, a rotatable shaft, a crank and a connecting rod operatively connected with said arm and with said shaft whereby rotation of said shaft effects substantially longitudinal movement of said arm with the push bar carried thereby, a cam-like member supporting said arm at the underside and intermediate the ends thereof, and means operatively connecting said rotatable shaft with said cam-like member, whereby the latter mentioned member and said crank and connecting rod may be driven in timed relationship with respect to each other.

6. A glassware transferring device comprising, the combination of a rotatable transfer disc adapted to receive glass articles and transfer them to a moving conveyor belt, a conveyor belt adapted to receive articles from said transfer disc and convey them to a position adjacent an annealing lehr, a pusher bar positioned adjacent said conveyor belt, an arm carrying said pusher bar, a rotatable shaft, a crank and a connecting rod operatively connected with said arm whereby rotation of said shaft effects substantially longitudinal movement of said arm with the pusher bar carried thereby and said pusher bar moves glassware from said conveyor belt onto a lehr conveyor, a cam-like member supporting said arm at the underside and intermediate the ends thereof, and means operatively connecting said rotatable shaft with said cam-like member, whereby the latter mentioned member and said crank and connecting rod may be driven in timed relationship with respect to each other.

7. In a mechanism for removing glassware from a conveyor, the combination of a vertically and generally longitudinally movable arm, a push bar carried by and normally retained in fixed position with respect to said arm, a rotatable cam, said arm resting at its undersurface against a supporting surface of said cam, means for simultaneously moving said arm longitudinally and rotating said cam to thereby move the arm vertically together with said push bar, whereby said push bar may elevate and move transversely over the conveyor so as to pass over any glassware on the conveyor.

8. In a mechanism for removing glassware from a conveyor, the combination of a vertically and generally longitudinally movable arm, a push bar carried by and normally retained in fixed position with respect to said arm, a rotatable cam for supporting said arm, a guide member, means movable to and fro along said guide member, additional means operatively connected with said first means and with said rotatable cam for simultaneously moving said first means and arm longitudinally to and fro and for rotating said cam to thereby move the arm vertically together with said push bar, whereby said push bar may elevate and move transversely over the conveyor so as to pass over any glassware on the conveyor.

9. In a glassware transferring mechanism, the combination of a push bar for removing glassware from a conveyor, a pair of spaced arms movable vertically and generally longitudinally and carrying said push bar, a pair of rotatable cams, said arms resting at their undersurfaces against supporting surfaces of said cams, guiding flanges projecting vertically beyond the supporting surfaces of said cams and extending alongside portions of said arms for maintaining the arms in alignment with said supporting surfaces of the cams, and means for rotating the cams to vertically move the arms and for longitudinally moving the arms to effect substantially crosswise movement of the push bar with respect to said conveyor.

10. In a glassware transferring mechanism, the combination of a push bar for removing glassware from a conveyor, an arm movable vertically and generally longitudinally and carrying said push bar, a cam, said arm resting at its undersurface against a supporting surface of said cam, a guiding flange projecting vertically beyond the supporting surface of said cam and extending alongside a portion of said arm for maintaining the arm in alignment with said supporting surface of the cam, and means for rotating the cam to vertically move the arm and for longitudinally moving the arm to effect substantially crosswise movement of the push bar with respect to said conveyor.

11. In a glassware transferring device of the class described, the combination of a push bar, a lengthwise oscillatable and vertically movable arm carrying said push bar, means including a rotatable member for oscillating said arm lengthwise to effect movement of the push bar across a conveyor and removal of glassware from the conveyor, a rotatable cam member supporting said arm adapted to elevate the arm during lengthwise movement thereof toward an initial position, and selectively settable means including a slot in one of said members and a pin carried by the other of said members and projecting through said slot operatively interconnecting said arm and said cam member for adjusting the timing of said vertical movement with respect to lengthwise movement of said arm.

OPAL SMITH.
ORAL C. DUDLEY.

REFERENCES CITED

The following references are of record in the file of this patent:

UNITED STATES PATENTS

| Number | Name | Date |
|---|---|---|
| 1,427,164 | Niver | Aug. 29, 1922 |
| 1,662,271 | Johnson | Mar. 13, 1928 |
| 1,869,767 | Nagle et al. | Aug. 2, 1932 |
| 2,077,830 | Failinger | Apr. 20, 1937 |
| 2,080,858 | Dorman | May 18, 1937 |
| 2,094,497 | Ross | Sept. 28, 1937 |
| 2,096,656 | Stoulil | Oct. 19, 1937 |